United States Patent [19]

Eschbach

[11] Patent Number: 5,293,254
[45] Date of Patent: Mar. 8, 1994

[54] METHOD FOR MAINTAINING BIT DENSITY WHILE CONVERTING IMAGES IN SCALE OR RESOLUTION

[75] Inventor: Reiner Eschbach, Webster, N.Y.

[73] Assignee: Xerox Corporation, Stamford, Conn.

[21] Appl. No.: 802,790

[22] Filed: Dec. 6, 1991

[51] Int. Cl.$^5$ .............................................. G06K 9/36
[52] U.S. Cl. ..................................... 358/445; 358/456
[58] Field of Search ............... 358/445, 443, 447, 455, 358/454, 451, 448, 456; 382/55, 47

[56] References Cited

U.S. PATENT DOCUMENTS

| 4,280,144 | 7/1981 | Bacon | 358/280 |
|---|---|---|---|
| 4,437,122 | 3/1984 | Walsh et al. | 358/166 |
| 4,679,039 | 7/1987 | Neil et al. | 340/728 |
| 4,847,641 | 7/1989 | Tung | 346/154 |
| 5,018,217 | 5/1991 | Yoshida et al. | 382/55 |
| 5,020,122 | 5/1991 | Walsh et al. | 358/452 |
| 5,053,887 | 10/1991 | Thompson | 358/456 |
| 5,113,455 | 5/1992 | Scott | 358/451 |
| 5,191,640 | 3/1993 | Plass | 358/448 |

FOREIGN PATENT DOCUMENTS 246137A 5/1985 Japan.

*Primary Examiner*—Stephen Brinich
*Attorney, Agent, or Firm*—Gary B. Cohen; Mark Costello

[57] ABSTRACT

A method is provided for increasing resolution of an input image in an input bitmap while performing a density preserving smoothing operation. The input bitmap includes a first set of pixels K×L×b, and the method comprises the following steps: (a) mapping the first set of pixels into a second set of individual pixels κK×λL×b, each of the individual pixels of the second set having a value selected from a set of "b" output states; (b) developing pixel arrays from the second set of individual pixels, the pixel arrays respectively representing local neighborhoods for the individual pixels of the second set, each of the local neighborhoods having a value selected from a set of "c" output states; (c) combining the output state of each individual pixel with the output state of its respective local neighborhood resulting in a selected one of a plurality of decision states, each of the decision states reflecting a current output state of a selected individual pixel and preference of the selected individual pixel for one of the selected b output states, at least one of the decision states having at least one counterpart in the set of decision states; (d) examining the individual pixels within a preselected area to locate a preselected number of individual pixels including a first individual pixel having a selected one of the decision states and at least a second individual pixel having a counterpart value to the selected one of the decision state of the first individual pixel; and (e) altering the respective output states of the first and second individual pixels when each of the first and second individual pixels are within the preselected area wherein the resolution of the output image is changed and the output image is smoothed without altering the density of the output image relative to the input image.

28 Claims, 9 Drawing Sheets

METHOD FOR MAINTAINING BIT DENSITY WHILE CONVERTING IMAGES IN SCALE OR RESOLUTION

BACKGROUND OF THE INVENTION

1. Field of the Invention

The present invention relates generally to a technique for converting images in scale or resolution, and more specifically to a technique in which the bit density of a resulting output image is substantially the same as that of the input image.

2. Description of the Prior Art

Image information, be it color or black and white, is commonly generated in a bitmap format at a particular scale, orientation $\theta$ and resolution $K \times L \times b$, corresponding to a desired printer output, where K is a number of spots per unit of length in one dimension, L is a number of spots per unit length in the other dimension, and b is the depth of each pixel, in number of levels. This bitmap is present for every color separation of the output device, i.e., 4 bitmaps for a 4-color output device, 3 for a 3-color, 2 for a 2-color and 1 for a black and white output device. In a common example of a black and white output, image data comprising a bitmap to be printed is provided to a printer suitable for printing at 300 spots per inch (spi) in both dimensions, at a one bit depth giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation also usually provide only a single resolution output. Images are commonly arranged at a fixed orientation Increasingly, the resolution available from printers varies over a wider range of choices. Printer resolutions are available over a range, for example, from less than 200 spi to more than 600 spi. Resolutions vary for a number of reasons, generally related to the quality of the output image. Simply printing a 300 spi bitmap at 400 spi or 600 spi is undesirable however, since the image will be reduced substantially in size on the output page or display. It would be highly desirable to provide the capability of printing any image at any resolution, while selecting the output size and orientation.

It is a common practice to implement conversion of a bitmap of first resolution $K \times L \times b$ to a bitmap of second resolution $M \times N \times d$ through simple pixel level and raster level operations, such as pixel doubling. When resolution is changed by integer multiples, the resolution conversion can be achieved by pixel replication. Pixel replication, however, does not best use the capabilities of higher resolution output devices. Hence in performing resolution conversion with a higher resolution output device it is desirable to perform a smoothing operation.

Scaling is an identical operation to resolution conversion, i.e., the number of pixels representing the image is increased, except that output image is represented by a lower resolution than the number of increased pixels representing the image. In other words, a conversion is implemented for a bitmap of first resolution $K \times L \times b$ to a bitmap of second resolution $M \times N \times d$ through simple pixel level and raster level operations, such as pixel doubling, but if the image is then directed to a $K \times L \times b$ for output, it is considered scaled.

Alternatively, more elaborate methods than pixel replication have been developed to facilitate resolution conversion, some of which are described in U.S. patent application Ser. No. 07/513,415, filed Apr. 23, 1990, entitled "Bit-Map Image Resolution Converter," and U.S. patent application Ser. No. 07/588,125, filed Sep. 25, 1990, entitled "Bit-Map Image Resolution Converter Compensating for Write-White Xerographic Laser Printing," the pertinent portions of each patent application being incorporated herein by reference. Each of the above-mentioned patent applications contemplates a method of magnifying, by a predetermined magnification factor (n), original image pixels in two dimensions. The method includes the steps of selecting an original image pixel, as well as determining the binary state of both the selected original image pixel and all immediately surrounding original image pixels. Additionally, the selected original image pixel is expanded into an $n \times n$ array of magnified image pixels to represent the magnification of the selected original image pixel. Finally, a binary state is assigned to each pixel in the array of magnified image pixels according to the pattern of binary signals previously determined for the selected original image pixel and all immediately surrounding original image pixels. In the preferred embodiments of these patent applications, the assignment of the binary states to the pixels in the array of magnified image pixels is made according to a set of state determination rules.

Employing sophisticated resolution conversion techniques does not insure that the resulting output image will have a desirable appearance. For instance, the output image can be excessively blocky and/or contain noticeable "jaggies." Hence, smoothing operations are sometimes used in conjunction with the conversion or scaling of the image. Through use of the state determination rules in the techniques of the above-mentioned applications, smoothing operations are achieved. For example, the method of the patent application entitled "Bit-Map Image Resolution Converter" permits such operations as smoothing of edges, smoothing of half-bitting effects and smoothing of lines. Moreover, the method of the patent application entitled "Bit-Map Image Resolution Converter Compensating for Write-White Xerographic Laser Printing" permits enhancing of single bits in printing and compensating for loss of resolution in write-white printing.

The following patents also disclose techniques for achieving a higher degree of smoothing in the output image:

U.S. Pat. No. 4,280,144, Patentee: Bacon, Issued: Jul. 21, 1981

U.S. Pat. No. 4,437,122, Patentee: Walsh et al., Issued: Mar. 13, 1984

U.S. Pat. No. 4,670,039, Patentee: Neil et al., Issued: Jul. 7, 1987

U.S. Pat. No. 4,847,641, Patentee: Tung, Issued: Jul. 11, 1989.

U.S. Pat. No. 4,280,144 discloses a coarse scan/fine print algorithm. In particular the algorithm is adapted for use in a scheme in which a pixel having two levels of information is transmitted and then reconstructed into a pixel having four levels of information.

U.S. Pat. No. 4,437,122 discloses a technique for enhancing the resolution and quality of characters of a system receiving information initially in the form of image data. Through use of the technique images can be smoothed by appropriately processing unenhanced input pixels. That is, an array of subpixels can be mapped on to a selected unenhanced pixel, and the subpixels of the array can be outputted selectively as black or white to permit smoothing of the resulting output image.

U.S. Pat. No. 4,670,039 discloses a method for smoothing the display of contiguous parallel line segments in a manner to reduce the discontinuities that occur near the ends of the line segments. Smoothing is achieved by adding auxiliary dots of a lesser diameter below the larger main dots forming a first line segment in a given row and adding the same size auxiliary dots above the main dots of an adjacent line segment when the latter are in a row below the given row. The smoothing operation is optimized for multiple cases and line orientations and more than three different dot sizes can be used in the smoothing operation.

U.S. Pat. No. 4,847,641 discloses a technique for enhancing the printing of bit mapped images by piecewise matching of the bitmap with predetermined stored templates or patterns to detect occurrence of preselected bitmap features. Whenever a match occurs, an error signal is generated to produce a corrected or compensated dot or cell to replace a matched bitmap cell. In this manner the printed image of the desired bitmap image is enhanced by substituting in the original bitmap image on a piece-by-piece or cell-by-cell basis, the cells of the preselected feature with error compensated subcells.

None of the above references specifically contemplates a technique for resolution conversion or scaling with a smoothing operation in which bit density and corners are preserved. Since altering bit density and/or smoothing corners may be unacceptable in certain resolution conversion or scaling operations, it would be desirable to provide a resolution conversion or scaling method in which smoothing is achieved without affecting the bit density or integrity of the corners.

SUMMARY OF THE INVENTION

In accordance with the present invention a method is provided for increasing resolution of an input image in an input bitmap while performing a density preserving smoothing operation. The input bitmap includes a first set of pixels $K \times L \times b$, and the method comprises the following steps:

(a) mapping the first set of pixels into a second set of individual pixels $\kappa K \times \lambda L \times b$, each of the individual pixels of the second set having a value selected from a set of "b" output states;

(b) developing pixel arrays from the second set of individual pixels, the pixel arrays respectively representing local neighborhoods for the individual pixels of the second set, each of the local neighborhoods having a value selected from a set of "c" output states;

(c) combining the output state of each individual pixel with the output state of its respective local neighborhood resulting in a selected one of a plurality of decision states, each of the decision states reflecting a current output state of a selected individual pixel and preference of the selected individual pixel for one of the selected b output states, at least one of the decision states having at least one counterpart in the set of decision states;

(d) examining the individual pixels within a preselected area to locate a preselected number of individual pixels including a first individual pixel having a selected one of the decision states and at least a second individual pixel having a counterpart value to the selected one of the decision state of the first individual pixel; and (e) altering the respective output states of the first and second individual pixels when each of the first and second individual pixels are within the preselected area wherein the resolution of the output image is changed and the output image is smoothed without altering the density of the output image relative to the input image.

In one example of the disclosed embodiment of the present invention, the examining step comprises the step of pairing the first and second individual pixels when the first and second pixels are within a predetermined distance of one another.

In another example of the disclosed embodiment of the present invention, when the resolution/scale is increased by two, the first individual pixel is disposed immediately adjacent the second individual pixel, and the predetermined area is a $3 \times 3$ array of the individual pixels with the first individual pixel constituting the central pixel of the array.

Various features of the inventive method will be appreciated by those skilled in the art. First, upon converting or scaling an input image, the bit density of a resulting output image is the same as that of the input image. Preserving bit density in this manner allows for correct tone reproduction along with suppression of moiré in halftone patterns. Second, desirable levels of smoothing can be achieved while preserving the corners of text and graphics. Finally, in using the inventive method, information regarding single bits is not lost.

These and other aspects of the invention will become apparent from the following description, the description being used to illustrate a preferred embodiment of the invention when read in conjunction with the accompanying drawings.

DESCRIPTION OF A PREFERRED EMBODIMENT OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
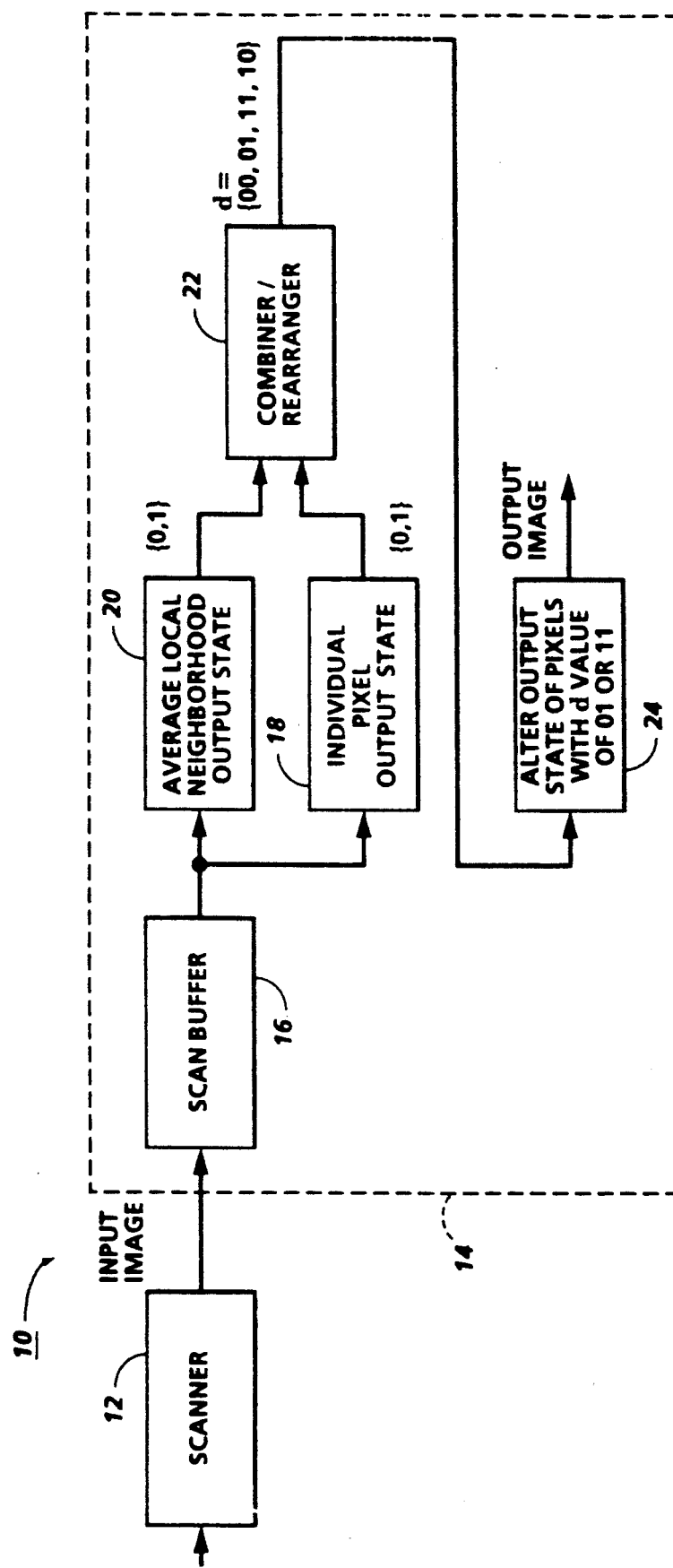
FIG. 1 is a schematic view of an arrangement used to implement a known method of resolution conversion and smoothing.

Referring to FIG. 1 an apparatus for performing a known method of resolution conversion is designated by the numeral 10. The apparatus 10 comprises a scanner 12 coupled with a computer 14. The computer 14 comprises a suitable number of buffers, registers, comparators and other suitable logical components necessary to implement the known method described below. In other contemplated embodiments, the computer 14 can be integrated as part of the scanner 12, as part of a printer or as part of any device having suitable hardware and software. The computer 14 includes a scan buffer 16, the scan buffer 16 being adapted to receive image data from the scanner and including a memory for storing image data. Output of the scan buffer 16 is communicated, in parallel, to suitable devices 18 and 20 adapted to respectively determine the output state of an individual pixel and the average output state of that pixel's local neighborhood.

In the illustrated embodiment of FIG. 1, the output state determining devices 18, 20 are respectively capable of outputting a selected output state from sets of b and c output states. As will be appreciated by those skilled in the art, an output state corresponds to a level of discretized information. For the exemplary case discussed below, b=c=2 and the output states correspond respectively to the set of values {0,1}.

Outputs of the devices 18, 20 are respectively communicated to an input of a combiner/rearranger 22. The combiner/rearranger 22 is configured to output a selected one of a set of d truth table states, each of which states varies as a function of the output of the devices 18, 20. The output of the combiner/rearranger 22 is communicated to a device 24, the device 24 being adapted to alter the output state of each individual pixel having a value that is equal to one of the entries in a truth-table. For the exemplary apparatus 10 of FIG. 1, d=4, i.e., the truth-table has four entries (00, 01, 10, 11).

Figure 2:
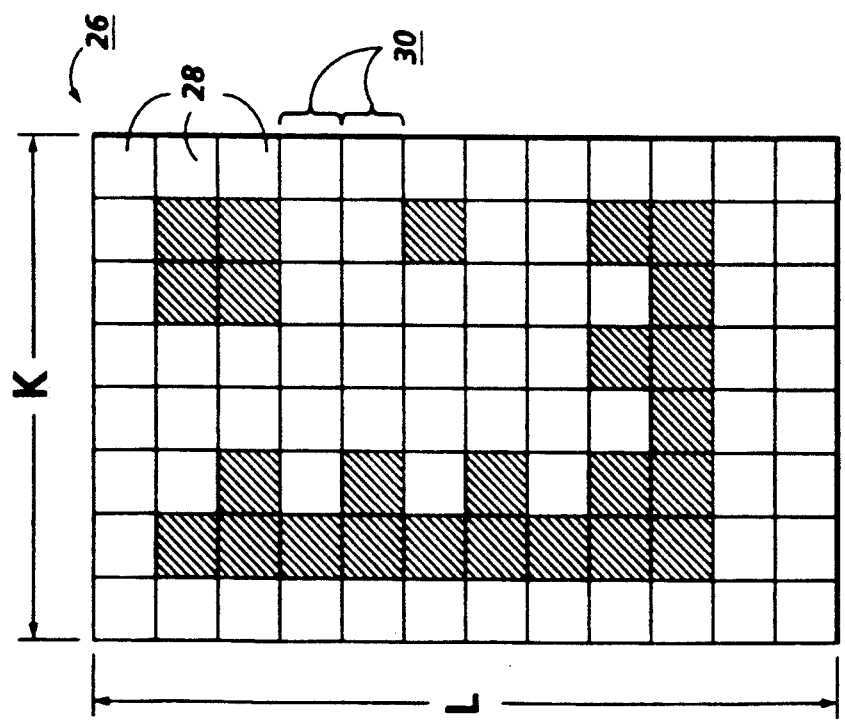
FIG. 2 is a plan view of an input bitmap with an input image.

Referring to FIG. 2 an input bitmap upon which the known method can be performed is designated by the numeral 26. The input bitmap 26 comprises an array of K×L×b pixels 28, the pixels being disposed in scanlines 30. The illustrated bitmap 26 of FIG. 2 is binary so that each of the pixels therein is either black or white. Referring to FIG. 2, a general explanation of the known method is provided. Initially, a preselected number of scanlines with corresponding pixels are scanned as shown in FIG. 1, and then the states for the corresponding pixels are stored in memory as an array of $K_B \times L_B$ pixels sufficient for operation, where the subscript "B" refers to the data that is currently available in the buffer.

Figure 3:
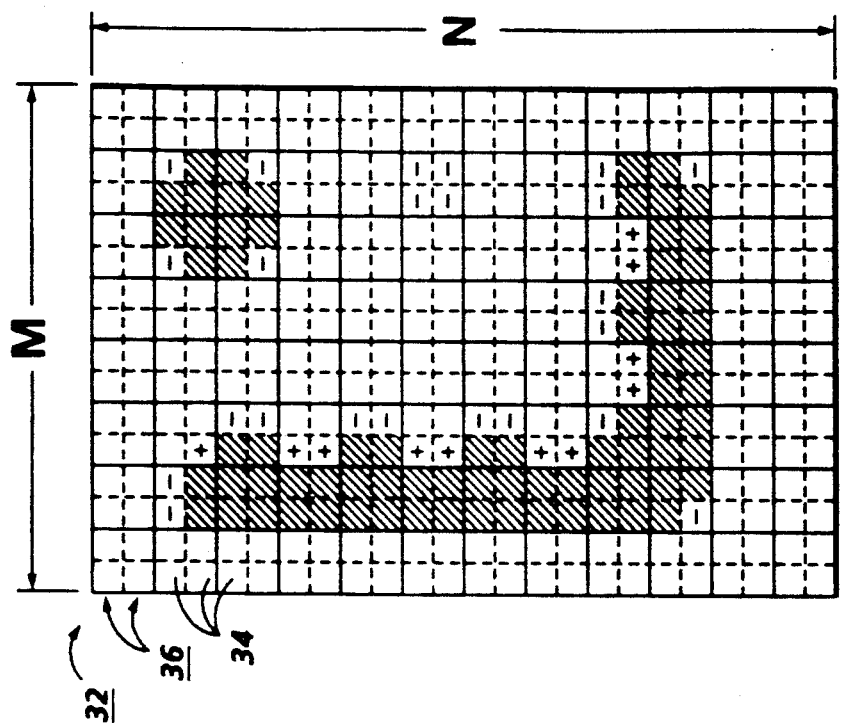
FIG. 3 is a plan view of the input bitmap mapped and processed for performing the known method of resolution conversion and smoothing.

Referring now to FIG. 3, an array of M×N×b pixels 34 is shown mapped on the input bitmap 26 to form a mapped bitmap 32, and each of the pixels 34 is disposed in one of scanlines 36. Preferably, the variables M and N have the following relationship to the variables K and L:

$$M = \kappa \times K$$

$$N = \lambda \times L$$

where $\kappa$ and $\lambda$ are integers.

In the known method, an array of $m_B \times n_B$ pixels 34 is mapped on each array of $k_B \times l_B$ pixels 28. In the example of FIGS. 2 and 3, the values of $\kappa$ and $\lambda$ are 2.

Referring now to FIG. 3, the four states or truth-table entries d are indicated by "+", "−", "0" and "1", and are derived in the following way. To determine one part of the truth table entries, a first output state (e.g. "0"), shown as white, or a second output state (e.g. "1"), shown as black, is assigned to each of the $m_B \times n_B$ pixels. Another part of the truth table entries is determined by "majority interpolation" in which a local neighborhood is defined for each of the $m_B \times n_B$ pixels. As can be recognized by those skilled in the art, a local neighborhood for a given pixel 34 can include that pixel and a preselected number of its neighboring pixels. Local neighborhoods for pixels disposed along the margins of the mapped bitmap can be developed using replicas of the marginal pixels and appropriate neighboring pixels. In the illustrated example, for each given pixel 34, the respective local neighborhood is a 3×3 array with the given pixel as the central pixel of the array.

The majority interpolation is used to assign the output state, $B_{m,n}$, to each of the neighborhoods, depending on whether the majority of pixels in each respective local neighborhood is black, $B_{m,n}=1$, or white $B_{m,n}=0$. Alternatively, output states could be assigned to the respective local neighborhood on the basis of a known pattern comparison technique. The outputs of devices 18, 20 are then combined and possibly rearranged, via the combiner/rearranger 22 of FIG. 1, and one of the four truth value entries is assigned to each pixel in the bitmap 32. As illustrated by FIG. 3, each of pixels is designated as white, white-positive ("+"), black-negative ("−") or black by using the following truth table:

when $I_{m,n}=0$ and $B_{m,n}=0$, then d=00 and the pixel is designated as white;

when $I_{m,n}=0$ and $B_{m,n}=1$, then d=01 and the pixel is designated as "+";

when $I_{m,n}=0$ and $B_{m,n}=0$, then d=11 and the pixel is designated as "−"; and when $I_{m,n}=1$ and $B_{m,n}=1$, then d=10 and the pixel is designated as black.

Additionally, each black-negative pixel in FIG. 3 is shown on a white background for convenience of viewing —in application the background of black-negative pixel is black.

Assigned truth table values can be converted to respective output values, i.e. $O_{m,n}$ values, by one of several known decision techniques, such as the "Majority" decision technique, the "Keep White" decision technique or the "Keep Black" decision technique. The $O_{m,n}$ values that would be designated under each of the three above-mentioned techniques for the four truth table entries of the present example are shown in the following table:

| d | Majority | Keep White | Keep Black |
| --- | --- | --- | --- |
| 00 | 0 | 0 | 0 |
| 01 | 1 | 0 | 1 |
| 10 | 1 | 1 | 1 |
| 11 | 0 | 0 | 1 |

Figure 4:
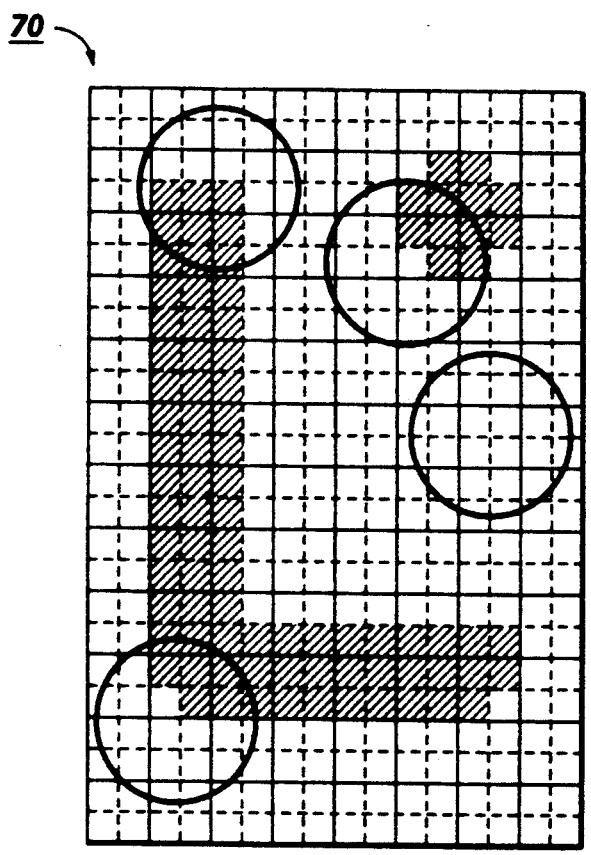
FIG. 4 is a plan view of an output bitmap with the input image of FIG. 2 converted and smoothed by the known method.

Referring to FIG. 4, upon processing the entire input bitmap 26 with the known method, the smoothed output image of output bitmap 70 is obtained through the use of the truth-table for the Majority decision technique. Although the above-discussed method produces a smoothing effect, it changes the bit density of the output image bitmap relative to the input image bitmap. Such loss of bit density is particularly undesirable for those operations in which bit density changes cannot be tolerated. Additionally, the known method fails to preserve corners in the output image. The preservation of corners can be of particular significance in the reproduction of text and graphics. As demonstrated by the circled areas of FIG. 4, the known method fails to maintain density and preserve corners. In particular, the circled areas illustrate the failure of the known method to reproduce gray, preserve edges and retain single-bits.

Figure 5A:
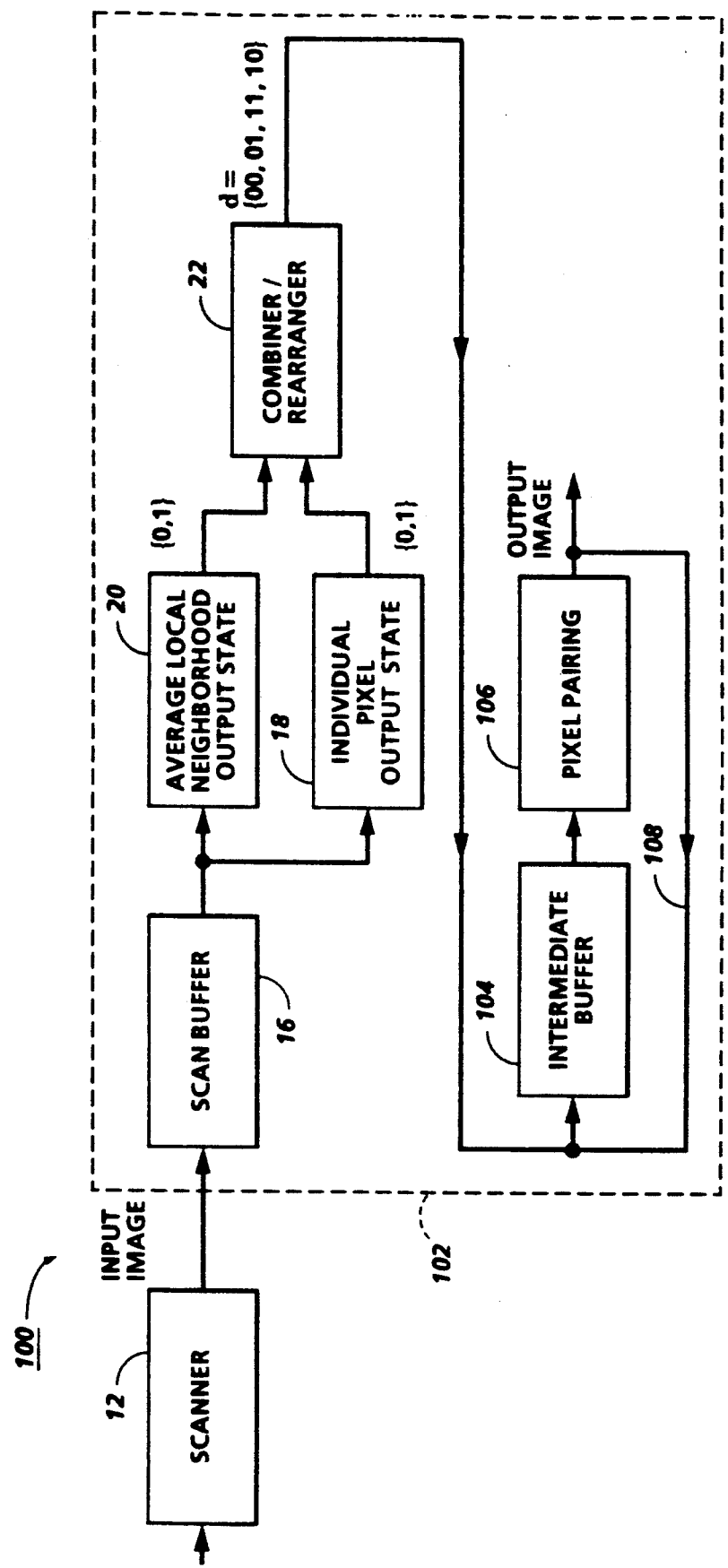
FIG. 5A is a schematic view of an arrangement used to implement an inventive method of resolution conversion and smoothing.

Referring to FIG. 5A, an apparatus for implementing an improved method of increasing the resolution of the input bitmap is designated by the numeral 100. The apparatus 100 includes the scanner 12 and a computer 102. The computer 102 possesses the same general structure as the computer shown in FIG. 1, except that an intermediate buffer 104 and a pixel pairing device 106 are substituted in place of the simple decision making device 24 of FIG. 1. Additionally, output of the pixel pairing device 106 is fed back to an input of the intermediate buffer 104 by way of a feedback line 108. The output of the local neighborhood information and the current pixel state is, as described previously, combined in the combiner/rearranger 22, and the result-one of the d truth table or decision states- that contains information about both the current state of the pixel from block 18 and information about the desired output state of the pixel from block 20 is temporarily stored in buffer 104. For simplicity, a binary output is assumed for each of these blocks 18, 20, leading to 4 decision states, d={00, 01, 10, 11}, using again for exemplary purposes d=00 as white, d=01 as white with a preference toward black, d=11 as black with a preference toward white, and d=10 as black. The two states d=01 and d=11 for this example are referred to as matching decision states. That is the decision state d=01 has a counterpart or matching state d=11, and vice versa.

The pixel pairing block 106 operates on buffer 104 to permit examination of each pixel in the bitmap 32 having an output state that is different from its preferred output state. Each examined pixel is viewed in context of a preselected group of neighboring pixels to determine if there is at least a pair of pixels with matching decision states within the preselected group. While in the preferred embodiment the boundary of each preselected group of pixels neighboring pixels coincides with the boundary of each local neighborhood, it is contemplated that the boundary of the preselected group could be greater than or less than the local neighborhood. Whenever a pair having matching decision states is found, the value of the states of both pixels are changed to their preferred state and the buffer 104 is updated. All pixels that are processed and no longer required for the processing of subsequent pixels are written to the output in a timely manner either from pixel pairing block 106, as indicated in FIG. 5A, or from the intermediate buffer 104. It will no doubt be appreciated, as discussed in further detail below, that the exchange of information and states can be performed for groups consisting of more than 2 pixels in such a way, that the net value of the current input states is preserved in the output. Moreover, in the preferred embodiment, it is the above-described pixel pairing capability that enables the present invention to perform density preserving smoothing operations.

Figure 5B:
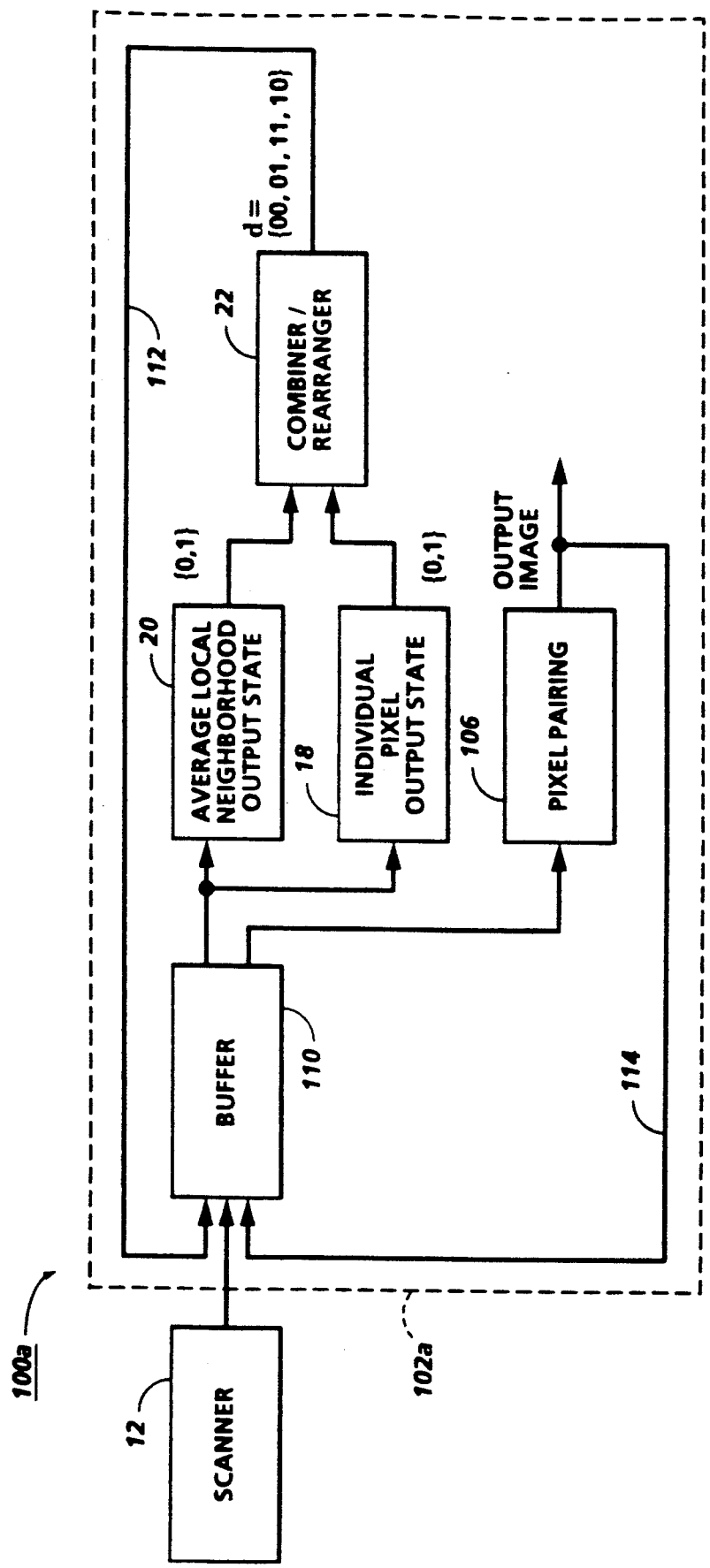
FIG. 5B is a schematic view of an alternative embodiment for the arrangement of FIG. 5A.

Referring to FIG. 5B, another embodiment of the apparatus 100 is designated by the numeral 100a. The apparatus 100a includes a computer 102a, the arrangement of computer 102a differs from the arrangement of computer 102 (FIG. 5A) in that a single buffer 110 integrates the functions of the scan buffer 16 and the intermediate decision state buffer 104. It will be appreciated that the computer 102a operates in much the same way as computer 102 except that the output of buffer 110 is communicated to an input of the pixel pairing device 106, and the outputs of both the combiner/rearranger 22 and the pixel pairing device 106 are communicated to the input of the buffer 110 by way of feedback lines 112, 114. Additionally, it will be recognized, that each of the buffers 104 and 110 (FIGS. 5A and 5B) are designed to include an appropriate memory section for storing decision states outputted from the combiner/rearranger 22. Finally, it can be noted that the buffer 104 operates at the desired output resolution, whereas the buffer 16 can have either input or output resolution, dependent on the actual implementation chosen.

Figure 6:
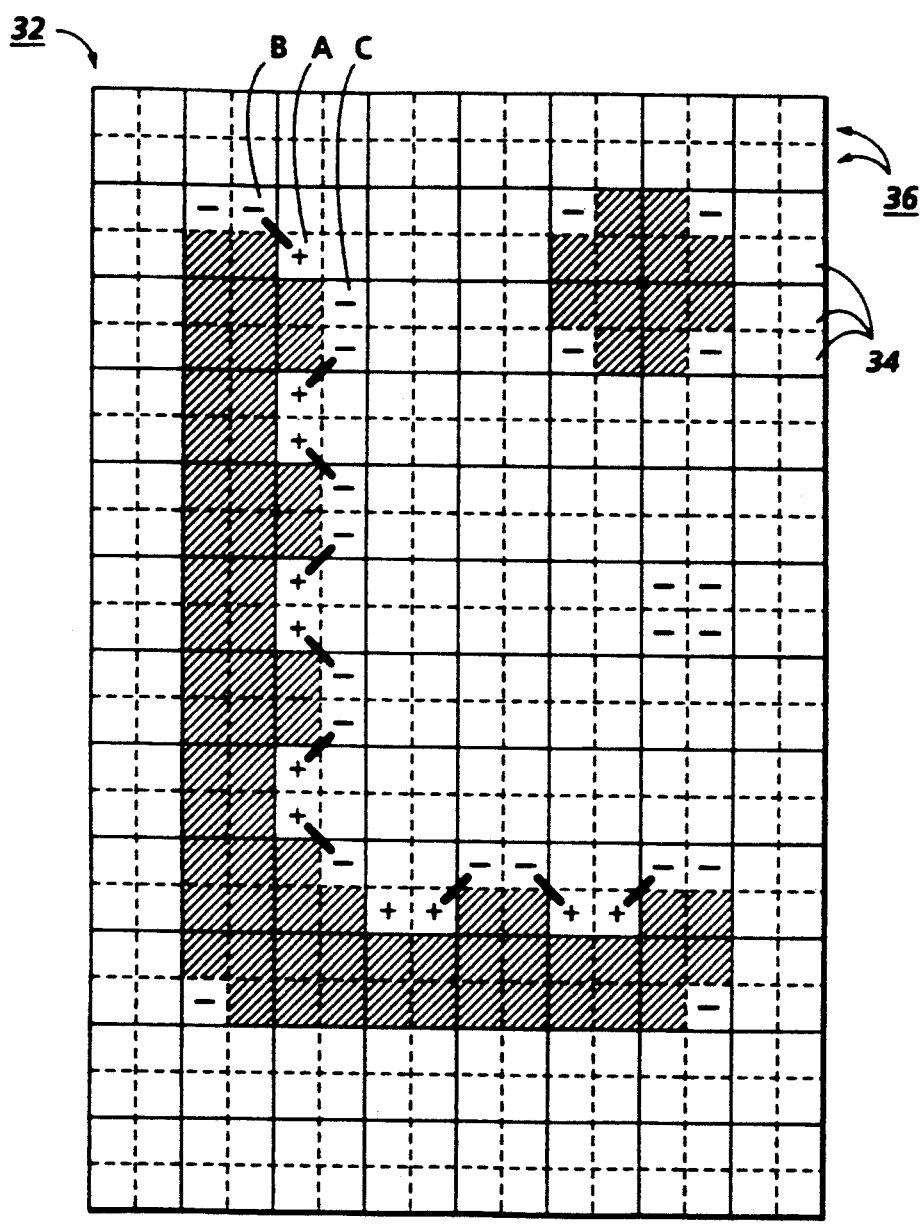
FIG. 6 is the bitmap of FIG. 3 with inside corner pixels and outside corner pixels paired in accordance with the inventive method.
Figure 7:
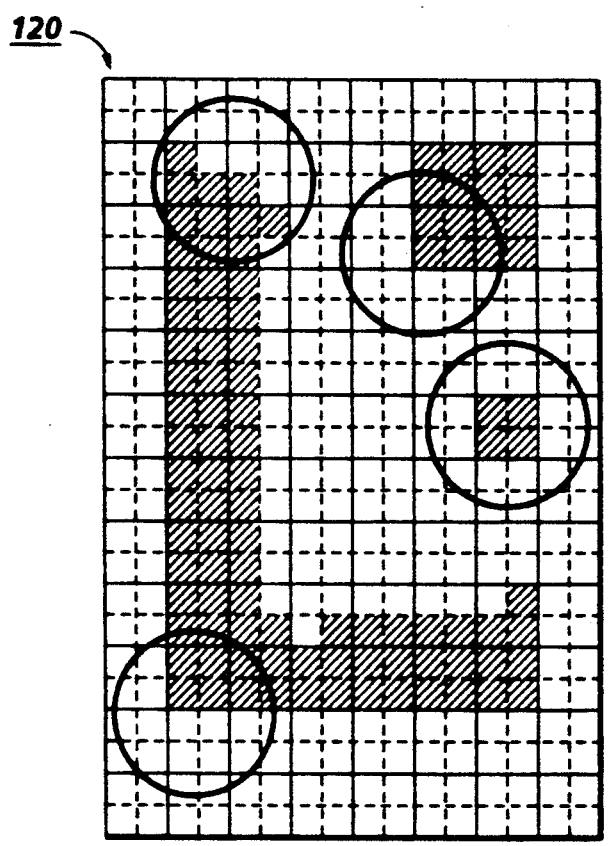
FIG. 7 is a plan view of an output bitmap with the input image of FIG. 2 converted and smoothed by the inventive method.

Using the framework of FIG. 5A and referring generally to FIGS. 6 and 7, the preferred mode of operation is discussed in further detail. It should be appreciated by those skilled in the art that the concepts underlying the operation of the apparatus of FIG. 5A are basically the same as those concepts underlying the operation of apparatus of FIG. 5B. Referring specifically to FIG. 6, the image of FIG. 3 is shown with pairings indicated by black lines. That is, in FIG. 6, each pixel has been examined, and, where appropriate, paired with a neighboring pixel. As indicated above, the pairings are generated in 3×3 neighborhoods, where the pairings are performed between decision states d=01 and d=11, i.e. between pixels whose current state is white and whose preferred state is black (d=01 indicated as "+") and pixels whose current state is black and whose preferred state is white (d=11 indicated as "−"). As can be appreciated, the total number of black or white pixels remains constant if for each of the indicated pairs an exchange from black to white for one pixel and from white to black for the other pixel is performed.

In the illustrated embodiment of FIG. 6, the pairing is performed for each pixel on a first-come-first-serve basis. In particular, due to their relative position in the data stream, the pixel indicated by the letter "A" is paired with the pixel indicated by the letter "B" rather than the pixel indicated by the letter "C". It should be noted that this pairing scheme is used for descriptive purposes only and is not intended to limit the pairing process in case of multiple pairing possibilities. Preferably, all pairs are changed, i.e. all paired pixels with decision state d=01 are changed to d=10 and an output of 1, and all paired pixels with decision state d=11 are changed to d=00 and an output of 0.

Referring to FIG. 7, an output image resulting from the resolution conversion of the input image of FIG. 2 is shown indicated by output bitmap 120. In forming the output image of FIG. 7 from the processed input image of FIG. 6, each of the unpaired pixels maintains its original density so that unpaired inside corners remain white and unpaired outside corners remain black. In particular, pixels that can not be paired by the inventive process are output as "0" for d=01 and "1" for d=11, maintaining the density of the image. For clarity, pseudo-code is included in an appendix, the pseudo-code performing the above-described operations of a 2× scaling of binary inputs under the assumption that the scan buffer 16 of FIG. 5A contains the higher output resolution generated through simple pixel replication of the input shown in e.g. FIG. 2. For simplification, the determination of the decision state and the pairing of matching pixels is done in two separate routines, using integer values of "0" to indicate d=10, "255" to indicate d=00, "125" to indicate d=01, and "100" to indicate d=11.

Referring still to FIG. 7, it can be recognized that the bit density of output bitmap 120 is the same as that for the input bitmap 26 of FIG. 2. This is a clear improvement over the output image of FIG. 4 generated using prior art, in which the bit density is altered relative to the input bitmap. Additionally, examination of the circled areas in FIGS. 4 and 7 indicate that the new method not only preserves the bitmap density but also provides for sharp corners and the inclusion of bit information that was deleted by use of the known method.

Figure 8:
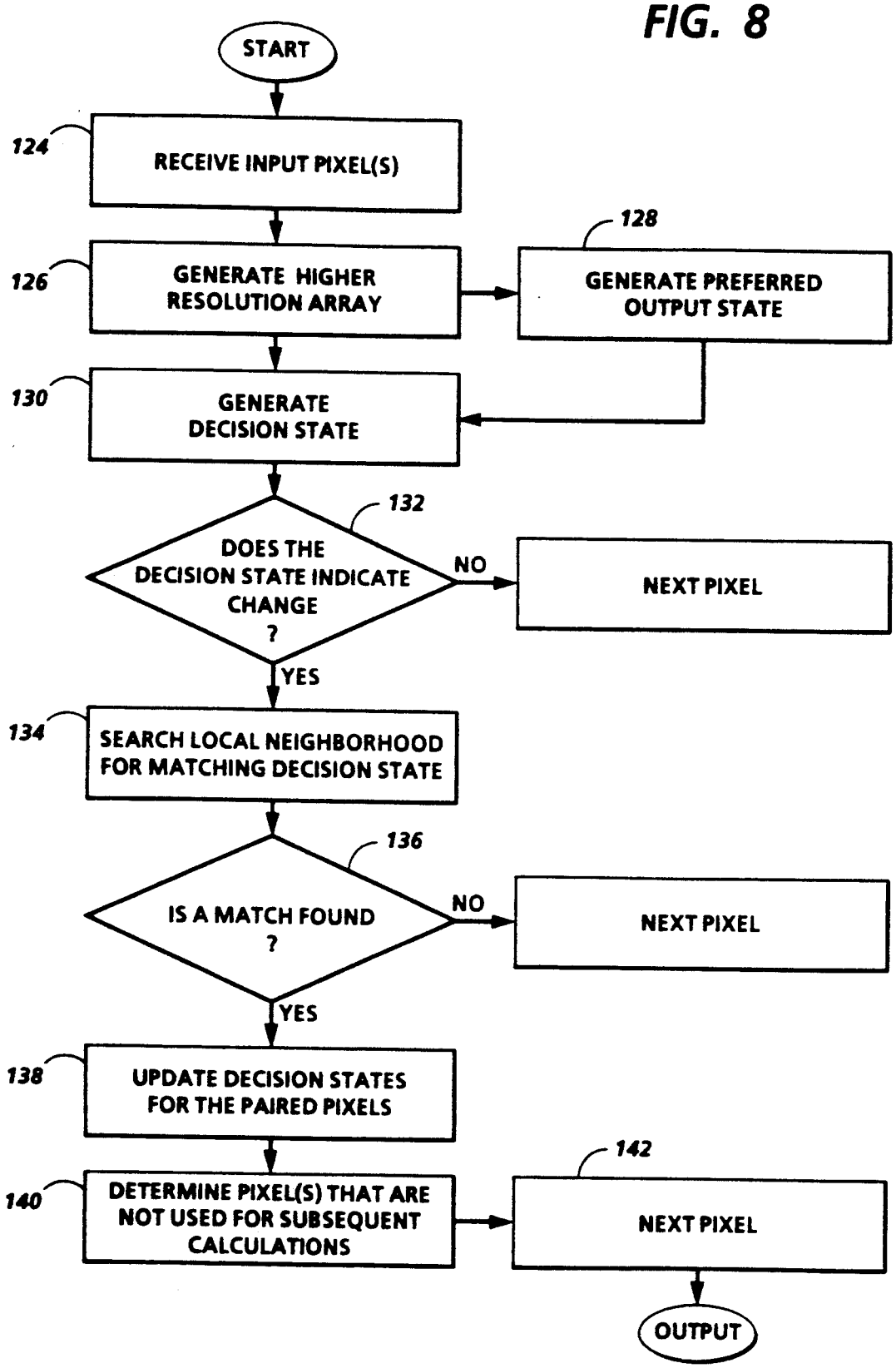
FIG. 8 represents a flow diagram for the inventive method.

Referring to FIG. 8, the inventive procedure receives input pixels at step 124 and generates a higher resolution array at step 126. From this information, a preferred output state is determined at step 128 and the information about the current output state and the preferred output state is combined into one of the d decision states at step 130. If it is determined at step 132 that the pixel under consideration has a decision state that does not indicate a preference for change, the next pixel is processed. If the decision state does indicate a preference for change, a local neighborhood is examined, at step 134 to find a matching decision state at one of the neighboring pixels. If no match is found at step 136, the next pixel is processed. If a match is found, the decision states for the paired pixels are changed into their preferred output states at step 138, simultaneously indicating that current and preferred state are in agreement. Subsequently, by way of steps 140 and 142, pixel(s) that are processed and are not needed for the processing of other pixels are transferred to the output, while the next pixel is processed.

Figure 9A:
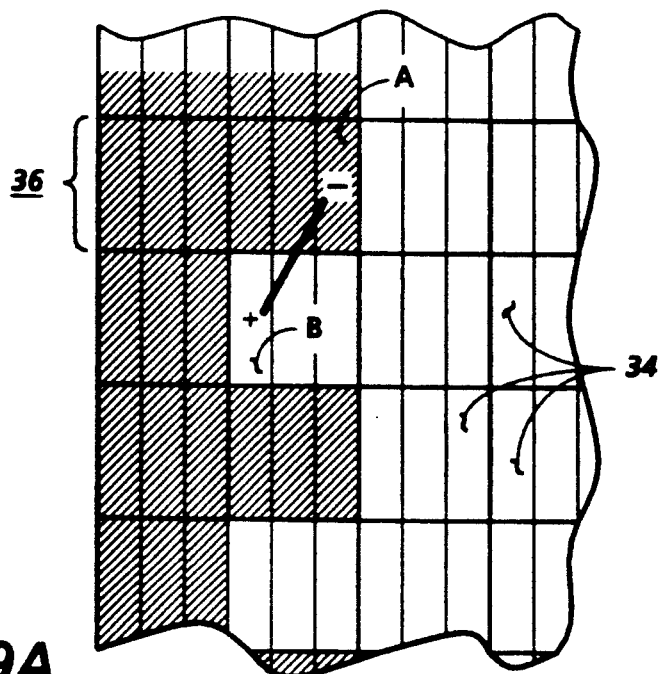
FIG. 9A is a plan view of a preselected group of pixels in a $300 \times 900$ spi bitmap with an inside corner pixel and an outside corner paired in accordance with the inventive method.

For those contemplated embodiments of the inventive method in which the preselected group of examined pixels for pairing matching decision states can be greater than a 3×3 array, the examined pixel need not touch the neighboring pixel with which the selected pixel is to be paired. Referring to FIG. 9A, an example in which non-touching neighboring pixels are paired is shown. In the example of FIG. 9A, two pixels are respectively designated as "A" and "B," and the local neighborhood for each of the pixels A and B comprises a 5×3 array. As shown in FIG. 9A, pixels A and B are outside and inside corners, respectively. When the neighboring pixels of the pixel A are examined, the outside corner A is paired with the non-touching inside corner B. As further demonstrated by the illustrated example of FIG. 9A, the conversion/scaling method of the present method can be performed anamorphically. That is, the inventive method can be used, as in the example of FIG. 9A, to convert or scale a 300×300 spi bitmap to a 300×900 spi bitmap.

Figure 9B:
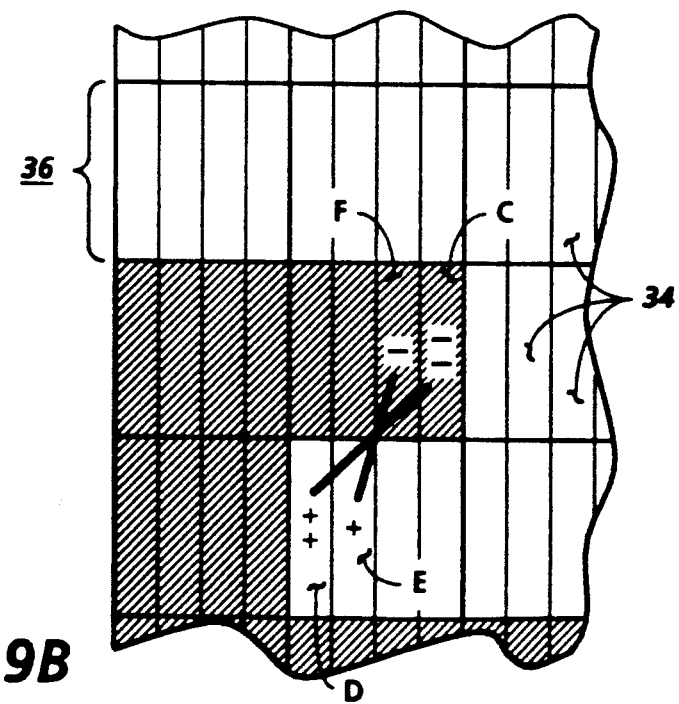
FIG. 9B is a plan view of a preselected group of pixels in a 300×1200 spi bitmap with inside corners and outside corners paired in accordance with another embodiment of the present invention.

Referring to FIG. 9B, it will be appreciated that for any preselected group of examined pixels, the decision state is not limited to contain only the information about the current state and the preferred state (2 bits for a binary input) but in general can contain a prioritization or weighting which is considered in the pairing. For instance, in the example of FIG. 9B, if only four decision states were employed, an outside corner "C" could be paired with a selected one of the inside corners "D" and "E", while an outside corner "F" could be paired with the other of the inside corners D and E. In one contemplated scheme, pairing could be performed on the basis of process direction as done for illustrative purposes in FIG. 6. In the illustrated example of FIG. 9B, however, the decision state to each of the pixels C, D, E and F contains information about priorities, and the pairing of the pixels is performed according to the given priority. For example, since the pixel C is surrounded by more white pixels than is the pixel F, the pixel C is assigned a decision state that is higher in priority for change than that of pixel F. On the other hand, since pixel D is surrounded by more black pixels than is the pixel E, the pixel D is assigned a decision state that is higher in priority for change than that of pixel E. In this contemplated scheme, the inside corner having the decision state with the highest priority, namely pixel C, is first paired with the outside corner having the decision state with the highest priority, namely pixel D. Then the inside corner having the lesser priority decision state, namely pixel F, can be paired with the outside corner having the lesser priority decision state, namely pixel E.

As can be appreciated from the application of the example of FIG. 9B, designating a pixel as "inside" or "outside" is an arbitrary process, and a greater degree of flexibility can be achieved with the inventive method when the set of decision states is at least greater than four. When using a set of decision states with more than four values, it is possible to pair pixels on the basis of criteria that are more flexible than the ones described above.

While the preferred embodiment of the present method has been shown for a binary case, it can be understood that the concept of the invention could be applied to a situation in which each pixel is multiple bit, or, in other words, has multiple graylevels. The use of two bit pixels in image processing is discussed in more detail in U.S. Pat. No. 4,868,587 (Patentee: Loce et al.), the pertinent portions of which are incorporated by reference. It will be appreciated by those skilled in the art, that it might be desirable to group more than two neighboring pixels and to change the intensity of two or more pixels in the group by way of a suitable set of decision states, keeping the overall density of the pixels involved constant.

---

APPENDIX

/* constants */

APPENDIX
-continued

```
whiteValue: CONSTANT = 225;
blackValue: CONSTANT = 0;
averageWhite: CONSTANT = 1275; /* Five pixels white */
averageBlack: CONSTANT = 1020; /* Five pixels black */
whiteAvgBlack: CONSTANT = 125; /* white wanting to be black */
blackAvgWhite: CONSTANT = 100; /* black wanting to be white */
line1: CONSTANT = 0; /* first line of buffer */
line2: CONSTANT = 1;
line3: CONSTANT = 2;
/*
Input a packed image of mPixels by nScanlines, where m=2k, n=21, generated by bit-
doubling the original k,1 size binary image. Procedure returns an image 8 bits per
pixel image with double the resolution with 4 values comprising: black = 0, white =
255, black wanting to be white = 100, white wanting to be black 125.
*/
Procedure1: FUNCTION [packedImage: PACKED ARRAY [0..mPixels−1][ 0..nScanlines−1]OF BIT]
    RETURNS [image: PACKED ARRAY [0..mPixels−1][ 0..nScanlines−1]OF BYTE]
BEGIN
/* variables */
average, nScanlines /* slowScan */, mPixels /* fastScan */ : CARDINAL;
buffer: PACKED ARRAY [0..mPixels+1][0..line3]OF BYTE;
/* unpack the image to 8 bits per pixel */
FOR (i=0; i < nScanlines; i++) DO
   FOR (j=0; j < mPixels; j++) DO
      IF packedImage [j][i] = blackValue
         THEN image [j][i] = blackValue
         ELSE image [j][i] = whiteValue;
/* read the first scanline twice into the buffer for averaging */
buffer [1..mPixels][line1] = image[0..mPixels−1][line1];
buffer [0][line1] = buffer [1][line1];
buffer [mPixels+1][line1]= buffer [mPixels][line1];
buffer [1..mPixels][line2] = image [0..mPixels−1][line1];
buffer [0][line2] = buffer [1][line2];
buffer [mPixels+1][line2] = buffer [mPixels][line2];
FOR (i=0; i < nScanlines; i++) DO /* for every scanline do the folliwng */
BEGIN
/* fill the buffer with the next scan line from the image */
IF i+1 < nScanlines
   THEN buffer [0..mPixels−1][line3] = image [0..mPixels−1][i+1]
   ELSE buffer [0..mPixels−1][line3] = image [0,.mPixels−1][i]
buffer [0][line3] = buffer [1][line3];
buffer [mPixels+1][line3] = buffer [mPixels][line3];
FOR (j=1; j <= mPixels; j++) DO
   BEGIN
   /* Average over 3×3 */
   average = buffer [j−1][line1] + buffer [j][line1] + buffer [j+1][line1]
   buffer[j−1][line2] + buffer [j][line2 ] + buffer [j+1][line2]
   buffer [j−1][line3 ] + buffer [j][line3] + buffer [j+1][line3];
   /* modify the image */
   image [j][i] = SELECT TRUE FROM
         /* Pixel is white, average is 'white' */
         (buffer [j][line2] = whiteValue) AND (average >= averageWhite) −> whiteValue;
         /* Pixel is black, average is 'black' */
         (buffer [j][line2] = blackValue) AND (average <= averagBlack) −> blackValue;
         /* Pixel is white, average is 'black' */
         (buffer [j][line2] = whiteValue) AND (average <= averageBlack) −> whiteAvgBlack;
         /* Pixel is black, average is 'white' */
         (buffer [j][line2] = blackValue) AND (average >= averageWhite) −> blackAvgWhite;
         ENDCASE;
      END; /* FOR (j=1; j <= mPixels; j++) */
   /* move the lines in the buffer up by one */
   buffer [0..mPixels−1][line1] = buffer [0..mPixels−1][line2];
   buffer [0..mPixels−1][line2] = buffer [0..mPixels−1][line3];
   END; /* FOR (i=0; i < nScanlines; i++) */
END; /* Procedure1 */
/*
Output from Procedure1 is passed to Procedure2 which returns a modified binary image
with the same resolution as the original image passed to Procedure1.
*/
Procedure2: FUNCTION [image: PACKED ARRAY [0..mPixels−1][0..nScanlines−1]OF BYTE]
    RETURNS [newImage: PACKED ARRAY [0..mPixels−1][0..nScanlines−1]OF BIT]
BEGIN
/* variables */
continue: BOONLEAN;
nScanlines /* slowScan */, mPixels /* fastScan */ : CARDINAL;
buffer: PACKED ARRAY [0..mPixels+1][0..line3]OF BYTE;
/* read the first scanline twice into the buffer */
buffer [1..mPixels][line1] = image[0..mPixels−1][line1];
buffer [0][line1] = buffer [1][line1];
buffer [mPixels+1][line1] = buffer [mPixels][line1];
buffer [1..mPixels][line2] = image [0..mPixels−1][line1];
```

APPENDIX

```
buffer [0][line2] = buffer [1][line2];
buffer [mPixels+1][line2] = buffer [mPixels][line2];
FOR (i=0; i < nScanlines; i++) DO
  BEGIN
  /* fill the buffer with the next scan line from the image */
  IF i+1 < nScanlines
     THEN buffer [1..mPixels][line3] = image [0..mPixels-1][i+1]
     ELSE buffer [1..mPixels][line3] = image [0..mPixels-1][i]
  buffer [0][line3] = buffer [1][line3];
  buffer [mPixels+1][line3] = buffer [mPixels][line3];
  FOR (j=1; j <= mPixels; j++) DO
    BEGIN
    /* black wanting to be white */
    /* only need to check one type */
    /* only need to check along the diagonals */
    IF buffer [j][line2] = blackAvgWhite THEN
      BEGIN
      buffer [j][line2] = whiteValue; /* set value to white */
      continue = TRUE;
      /* Can top-left be changed to to black? */
      IF buffer [j-1][line1] = whiteAvgBlack THEN
        BEGIN
        buffer [j-1][line1] = blackValue; /* Yes */
        continue = FLASE;
        END;
      /* Can top-right be changed to to black? */
      IF continue = TRUE AND buffer [j+1][line1] = whiteAvgBlack THEN
        BEGIN
        buffer [j+1][line1] = blackValue; /* Yes */
        continue = FALSE;
        END;
      /* Can down-left be changed to to black? */
      IF continue = TRUE AND buffer [j-1][line3] = whiteAvgBlack THEN
        BEGIN
        buffer [j-1][line3] = blackValue; /* Yes */
        continue = FLASE;
        END;
      /* Can down-right be changed to to black? */
      IF continue = TRUE AND buffer [j+1][line3] = whiteAvgBlack THEN
        BEGIN
        buffer [j+1][line3] = blackValue; /* Yes */
        Continue = FLASE;
        END;
      /* can't change it to white, set it to black. */
      IF continue = FLASE THEN
        buffer [j][line2] = blackValue;
      /* Only need to match up one type,
         so reset what is left of the other. */
      IF buffer [j-1][line1] >= whiteAvgBlack THEN
        buffer [j-1][line1] = whiteValue;
      END; /* IF buffer [j][i] = blackAvgWhite */
    END; /* FOR (j=1; j <= mPixels; j++) */
  /* Pack the buffer into the newImage */
  IF i = 0 THEN NULL /* if i equals the first scan line don't do anything yet */
  ELSE /* save the previous scan line */
    FOR (j=1; j <= mPixels; j++) DO
      IF buffer [j][line1] = blackValue
        THEN newImage [j][i] = 0 /* blackValue */
        ELSE newImage [j][i] = 1; /* whiteValue */
  /* if i equals the last scan line save it */
  IF i = nScanlines-1 THEN
    FOR (j=1; j <= mPixels; j++) DO
      IF buffer [j][line2 ] = blackValue
        THEN newImage [j][i] = 0 /* blackValue */
        ELSE newImage [j][i] = 1; /* whiteValue */
  /* Move the scan lines in the buffer up by one */
  buffer [0..mPixels-1][line1] = buffer [0..mPixels-1][line2];
  buffer [0..mPixels-1][line2] = buffer [0..mPixels-1][line3];
  END; /* FOR (i=0; i < nScanlines; i++) */
END; /* Prcedure2 */
```

What is claimed is:

1. An apparatus for increasing resolution of an input image in an input bitmap while performing a density preserving smoothing operation, the input bitmap including a first set of pixels, said apparatus comprising:
   means for mapping the first set of pixels into a second set of individual pixels, each of the individual pixels of the second set having a value selected from a first set of output states, each of the output states corresponding with a level of discretized information;
   means for developing pixel arrays from the second set of individual pixels, the pixel arrays respectively representing local neighborhoods for the individual pixels of the second set, each of the local neighborhoods having a value selected from a second set of output states, each of the output states of the second set of output states corresponding with a level of discretized information;

means for combining the output state of each individual pixel with the output state of its respective local neighborhood resulting in a selected one of a third set of output states based on a predetermined relationship between the first and second sets of output states, each of the output states of the third set of output states corresponding with a level of discretized information, the selected one of the third set of output states reflecting a current output state of a selected individual pixel and a preference of the selected individual pixel for a selected one of the output states of the first set of output states, at least one of the third set of output states having at least one counterpart in the third set of output states; and means for examining the individual pixels within a preselected area to locate a preselected number of individual pixels including a first individual pixel having a selected one of the third set of output states and at least a second individual pixel having a counterpart value to the first individual pixel having the selected one of the third set of output states, said examining means altering the respective output states of the first and second individual pixels when the first and second individual pixels are within the preselected area wherein the resolution of the output image is changed and the output image is smoothed without changing the density of the output image relative to the input image.

2. The apparatus of claim 1, wherein the output state of the first individual pixel remains unchanged when the second pixel is outside of the preselected area.

3. The apparatus of claim 1, wherein said examining means includes means for pairing the first and second individual pixel when the first pixel is within a predetermined distance of the second pixel.

4. The apparatus of claim 3, wherein the first individual pixel is disposed immediately adjacent the second individual pixel.

5. The apparatus of claim 1, wherein said means for mapping comprises a scanning device adapted to generate the input bitmap and a buffer including a memory, said scanning device and said buffer being coupled so that the first set of pixels can be transmitted to and stored in the memory of said buffer.

6. The apparatus of claim 5, wherein said buffer is capable of storing selected ones of the third set of output states and wherein said examining means communicates with said buffer for reading the selected ones of the third set of output states.

7. The apparatus of claim 1, wherein said examining means comprises a buffer capable of storing selected ones of the third set of output states, said buffer being in communication with an output of said combining means.

8. The apparatus of claim 1, wherein each of the local neighborhoods comprises a 3×3 pixel array.

9. The apparatus claim 1, wherein the first set of output states comprises two output states.

10. The apparatus of claim 1, wherein the second set of output states comprises two output states.

11. The apparatus of claim 1, wherein the third set of output states comprises four output states.

12. The apparatus of claim 1, wherein a boundary of each preselected area is the same as a boundary of each local neighborhood.

13. The apparatus of claim 1, wherein the resolution is increased by a factor of an integer value.

14. A method for increasing resolution of an input image in an input bitmap while performing a density preserving smoothing operation, the input bitmap including a first set of pixels residing in a memory, said method comprising the steps of:

mapping the first set of pixels into a second set of individual pixels, each of the individual pixels of the second set having a value selected from a first set of output states, each of the output states corresponding with a level of discretized information;

developing pixel arrays from the second set of individual pixels, the pixel arrays respectively representing local neighborhoods for the individual pixels of the second set, each of the local neighborhoods having a value selected from a second set of output states, each of the output states of the second set of output states corresponding with a level of discretized information;

combining the output state of each individual pixel with the output state of its respective local neighborhood resulting in a selected one of a third set of output states based on a predetermined relationship between the first and second sets of output states, each of the output states of the third set of output states corresponding with a level of discretized information, the selected one of the third set of output states reflecting a current output state of a selected individual pixel and a preference of the selected individual pixel for a selected one of the output states of the first set of output states, at least one of the third set of output states having at least one counterpart in the third set of output states; and examining the individual pixels within a preselected area to locate a preselected number of individual pixels including a first individual pixel having a selected one of the third set of output states and at least a second pixel having a counterpart value to the first individual pixel having the selected one of the third set of output states; and altering the respective output states of the first and second individual pixels when the first and second individual pixels are within the preselected area wherein the resolution of the output image is changed and the output image is smoothed without altering the density of the output image relative to the input image.

15. The method of claim 14, wherein the output state of the first individual pixel remains unchanged when the second pixel is outside of the preselected area.

16. The method of claim 14, wherein the examining step comprises the step of pairing the first and second individual pixels when the first and second pixels are within a predetermined distance of one another.

17. The method of claim 16, wherein the first individual pixel is disposed immediately adjacent the second individual pixel.

18. The method of claim 16, wherein when the first individual pixel is equidistant from both the second individual pixel and a third individual pixel and the first individual can be paired with the third individual pixel, said method further comprises a step for determining that the first individual pixel should be paired with the second individual pixel rather than the third individual pixel.

19. The method of claim 14, further comprising the step of storing a third set output state for each of the individual pixels in a second memory.

20. The method of claim 19, further comprising the step of erasing from the second memory the third set output states.

21. The method of claim 14, further comprising the step of storing a third set output state for each of the individual pixels in the memory.

22. The method of claim 14, wherein each of the local neighborhoods is a 3×3 pixel array.

23. The method of claim 14, wherein the first set of output states comprises two output states.

24. The method of claim 14, wherein the second set of output states comprises two output states.

25. The method of claim 14, wherein the third set of output states comprises four output states.

26. The method of claim 14, wherein a boundary of each preselected area is the same as a boundary of each local neighborhood.

27. The method of claim 14, wherein the resolution is increased by a factor of an integer value.

28. A method for increasing resolution of an input image in an input bitmap while performing a density preserving smoothing operation, the input bitmap including a first set of pixels residing in a memory, said method comprising the steps of:

mapping the first set of pixels into a second set of individual pixels, each of the individual pixels of the second set having a value selected from a first set of two output states, each of the output states corresponding with a level of discretized information;

developing pixel arrays from the second set of individual pixels, the pixel arrays respectively representing local neighborhoods for the individual pixels of the second set, each of the local neighborhoods having a value selected from a second set of two output states, each of the output states of the second set of output states corresponding with a level of discretized information;

comparing the output state of each individual pixel with the output state of its respective local neighborhood, the comparing step resulting in a selected one of values based on a predetermined relationship between the first and second sets of output states, each of the four values corresponding with a level of discretized information, the selected one of the four values reflecting a current output state of a selected individual pixel and a preference of the selected individual pixel for one of the first set of output states, at least one of the four values having at least one counterpart in the set of four values;

examining the individual pixels within a predetermined area to locate a pair of individual pixels including a first individual pixel having a selected one of the four values and a second pixel having a counterpart value to the first individual pixel having the selected one of the four values;

pairing the first and second individual pixels when the first and second pixels are within a predetermined distance of one another; and altering the respective output states of the first and second individual pixels when the first and second individual pixels are within the preselected area wherein the resolution of the output image is changed and the output image is smoothed without altering the density of the output image relative to the input image.

* * * * *